2 Sheets—Sheet 1.
S. HOYT.
Coffee Roaster.
No. 40,037. Patented Sept. 22, 1863.
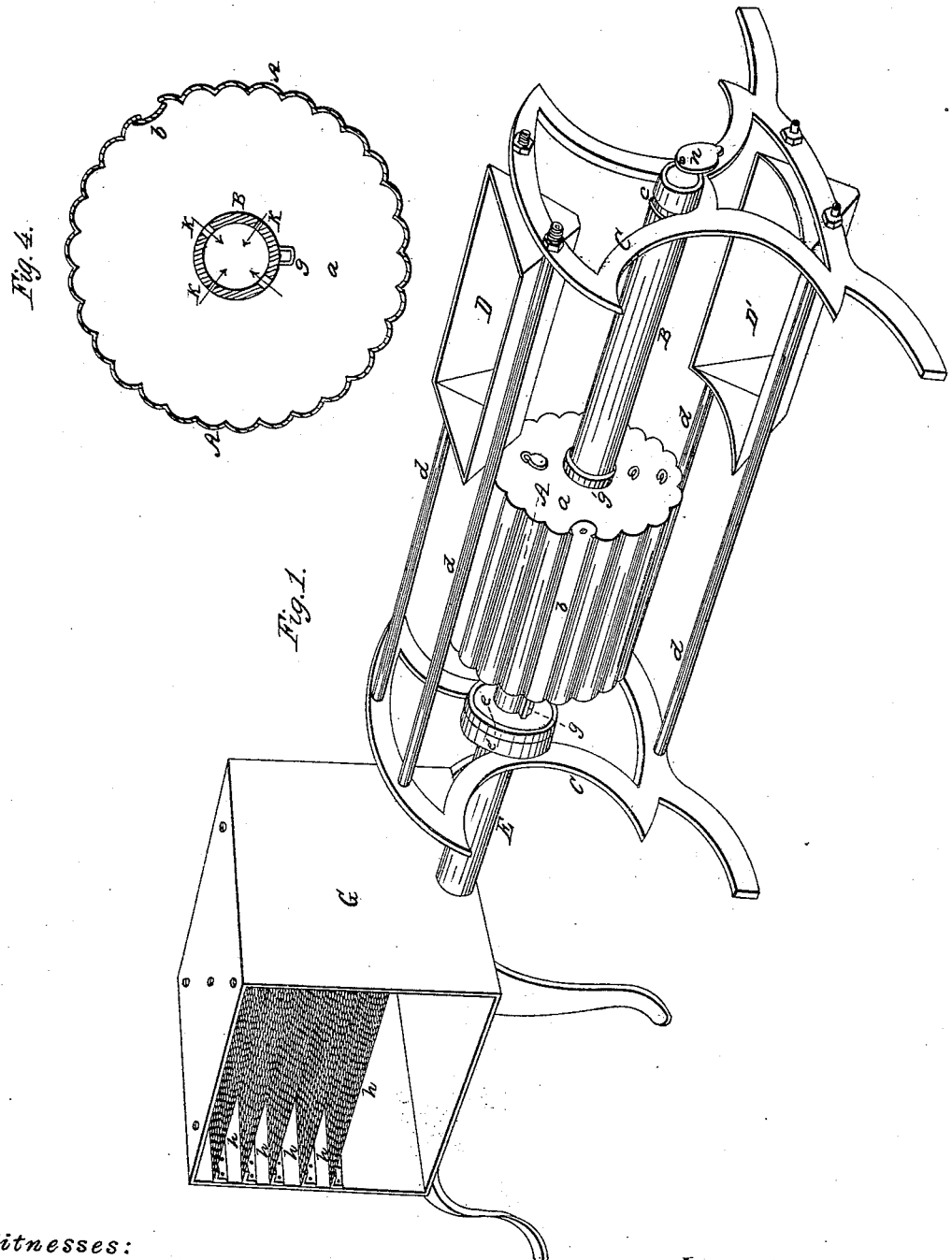
Witnesses:
R. T. Campbell.
O. Schafer.
Inventor:
Samuel Hoyt
by his Attys
Mason Fenwick & Lawrence S. HOYT.
Coffee Roaster.
No. 40,037.
2 Sheets—Sheet 2.
Patented Sept. 22, 1863.
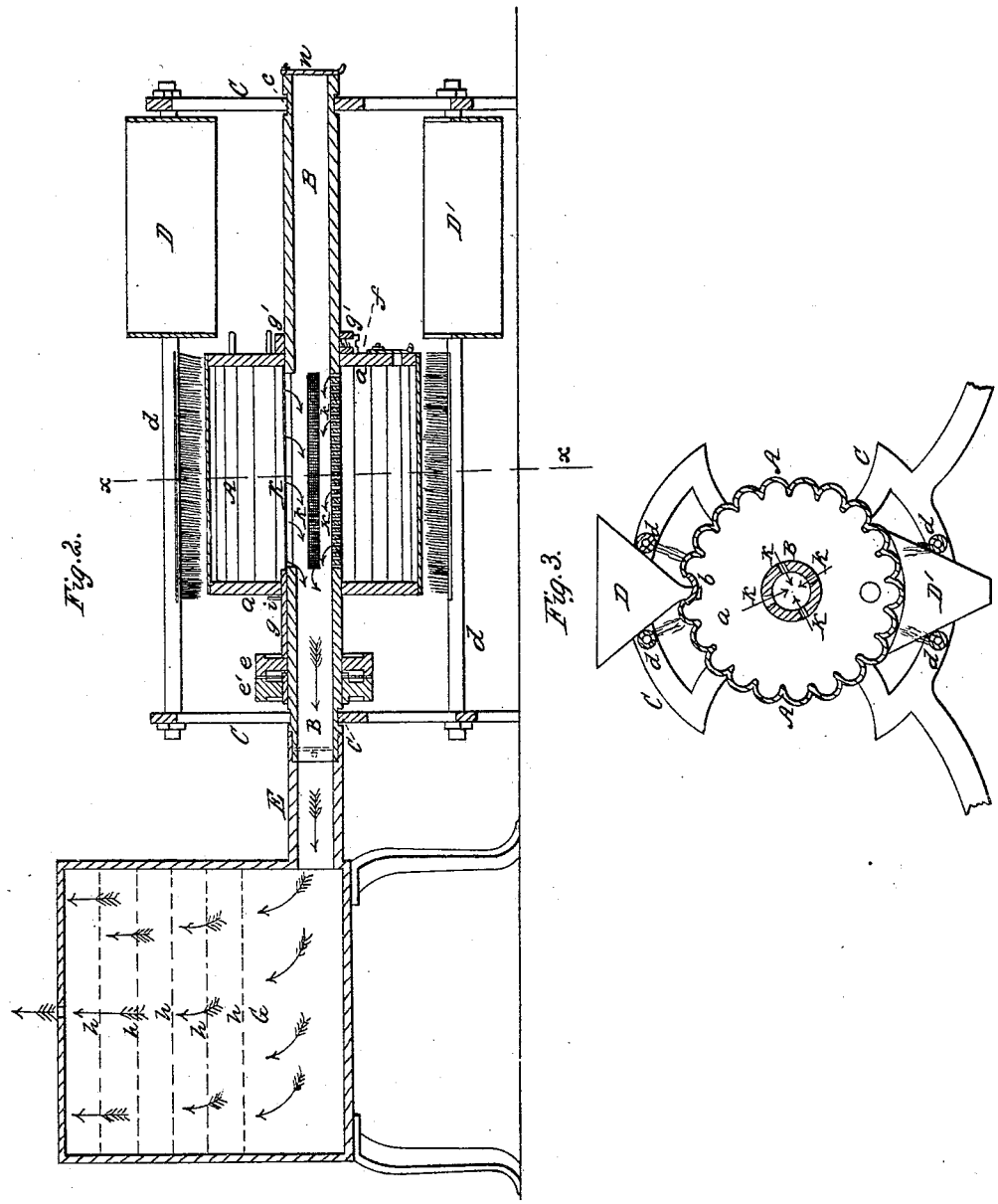
Witnesses:
R. T. Campbell.
E. Schafer.
Inventor:
Samuel Hoyt
by his Attys
Mason Fenwick & Lawrence

UNITED STATES PATENT OFFICE.

SAMUEL HOYT, OF NEW YORK, N. Y.

IMPROVEMENT IN COFFEE-ROASTERS.

Specification forming part of Letters Patent No. 40,037, dated September 22, 1863.

*To all whom it may concern:*

Be it known that I, SAMUEL HOYT, of the city, county, and State of New York, have invented a new and useful Improvement in Coffee-Roasters; and I do hereby declare that the following is a full, clear, and exact description thereof, reference being had to the accompanying drawings, making a part of this specification, in which—

Figure 1 is a perspective view of my improved roasting-machine with the aromatizing-chamber applied to it. Fig. 2 is a longitudinal vertical section taken through the center of the machine represented in Fig. 1. Fig. 3 is a vertical transverse section through the roasting-drum and gas-pipes, taken in the plane indicated by red line $x\ x$, Fig. 2. Fig. 4 is an enlarged sectional view of the roasting-drum, showing the manner of connecting it to its hollow shaft by a key-tenon.

Similar letters of reference indicate corresponding parts in the several figures.

The object of this invention is to roast coffee in a more thorough and economical manner and to utilize the gases and vapors which escape from the coffee during the roasting process by employing them for impregnating other berries or grain with the aroma of coffee.

The invention also has for its object the use of the flame of gas or of burning-fluid for roasting coffee in a very convenient, clean, and economical manner, as will be hereinafter described.

To enable others skilled in the art to make and use my invention, I will proceed to describe its construction and operation.

In roasting coffee two very important objects are to be considered. These are, first, that a constant and uniform but gentle heat must be kept up, in order that all the berries may be equally roasted; and, second, that all the berries of one roasting should be kept in constant motion, so that none of them will be burned and roasted more than others. This latter object has been found very difficult to accomplish, for with the large cylinders or drums which have hitherto been used the berries are not tossed or stirred about as they should be, but they remain in a compact mass at the "bottom" of the drum, while the latter revolves around them; and the drums, which are furnished inside with slats or shelves to obviate this difficulty, do not keep the coffee in constant contact with the heated circumference of the drum, and consequently the roasting process requires a long time at the expense of fuel.

My improved roasting-cylinder consists of two circular heads, having their circumferential edges scalloped, as shown in Figs. 1, 3, 4 of the drawings. To these heads $a\ a$, I secure the edges of a corrugated, ribbed, or waved plate, which is bent in a cylindrical form. In this way I obtain a drum having a corrugated or waved circumference, (interiorly and exteriorly corrugated.) At a suitable point in the circumference of the drum A, I leave a narrow opening extending from one head $a$ to the other, and this opening I close by means of a sliding plate, $b$, which can be readily removed for supplying the cylinder with berries or for emptying the cylinder. This slide $b$ is applied to the cylinder so as not to interfere with the contour of its circumference nor the operation of the corrugations.

B represents a hollow shaft which passes through the center axis of the roasting-cylinder A, and which has its bearings in the crotches of two upright standards, C C, and annular grooves $c\ c$ are made in the circumference of shaft B at its bearing-points, which prevent this shaft from moving endwise out of its place. The standards C C support the shaft B in a horizontal position, and the standards themselves are braced and held in position by means of four or more tubular bars, $d\ d\ d\ d$, two being above the shaft B and two beneath it, as shown in Figs. 1, 2, and 3. These tubes $d$, together with the standards, constitute the frame of the machine; but, besides this, the tubes serve another purpose, which will be hereinafter explained.

The shaft B is slightly longer than double the length of the cylinder A, and at one end of shaft B are two belt-wheels, $e\ e'$, one of which, $e$, is keyed fast to the shaft, while the other turns loosely, and alongside of the fast pulley $e$ is a key-tenon, $g$, having a pin, $i$, projecting from it. This tenon $g$ receives the head of cylinder A when it is slipped up against the stop-pin $i$, and prevents the cylinder from turning on its shaft. The collar $g'$, which is slipped up against the opposite head of the cylinder, is provided with a set-screw, $f$, which is used to prevent the cylinder from moving endwise away from the tenon $g$.

When the collar $g'$ is loosened, the cylinder A may be moved up to the opposite end of its shaft B and brought under and over the hoppers D D', which rest, respectively, on the upper and lower pairs of bars $d\ d\ d\ d$, as shown in Fig. 3. When in this position, the cylinder A may be rotated on its shaft, so as to bring its sliding door $b$ either under the mouth of hopper D to be filled, or over hopper D' to be emptied of its contents.

The end of the hollow shaft B nearest the pulleys $e\ e'$ is formed so as to fit into a corresponding shaft or pipe, E, and to make a closely-fitting sleeve-joint. This latter pipe E is affixed to and communicates with—it being hollow—the chamber in box G. This chamber contains a number of perforated or wire-gauze shelves, $h\ h$, which may be made to slide out and in, if desired, and through the top of the box G a number of holes are made communicating with the external air. This box G is mounted upon legs, so that its bottom will be level with the bottom of shaft B, thus allowing the pipe E to enter the chamber at the bottom thereof, and at the same time allowing this pipe to coincide with the end of pipe B, when brought up to it, as shown in Fig. 2. The chamber in box G communicates with the interior of cylinder A through the pipe E, shaft B, and perforated openings $k\ k$, which are made through the shaft B, as shown in Fig. 2. These perforations may be made by simply tapping small holes through the shaft, or oblong slots may be made and covered with wire-gauze, so as to allow gas and vapor only to escape from the cylinder through the shaft B, as indicated by the arrows in Fig. 2.

The operation of my invention is as follows: Motion is communicated to the hollow shaft B by means of a belt passing over the fixed pulley $e$, said belt being driven by some convenient prime motor. The motion of the shaft B is stopped by shifting the belt upon the loose pulley $e'$, and when this is done the cylinder A is released from its key-tenon $g$ by loosening the collar $g'$, when the cylinder can be slid along its shaft and brought under the hopper D. The door $b$ is now opened and the bottom of the hopper inserted into the opening thus made, when the article to be roasted—say coffee—can be introduced into the cylinder through the hopper thus arranged over it. The door being again closed, the cylinder A is pushed back to its former position and secured by means of the key-tenon $g$ and collar $g'$, as above described, so that it will rotate with its shaft B. The driving-belt is now shifted on the fixed pulley, and rotary motion is thereby given to the roasting-cylinder A and its shaft B. In this latter position the roasting-cylinder is subjected to the heat of flames which impinge upon its circumference, as shown in Figs. 2 and 3. These flames are produced by burning either gas or the common burning-fluids, which are introduced into the tubular bracing-rods $d\ d\ d\ d$, and caused to issue from openings in the same which are made directly under and over the cylinder, said burning compound being conducted into the tubes $d$ from a reservoir arranged in any convenient place about the building; or, if the common street-gas be used, the tubes $d$ are all connected to a pipe communicating with the main. This mode of supplying heat to the roasting-cylinder is very convenient and economical in many respects, and the intensity of heat can be regulated to a nicety. The heat can be instantly shut off when necessary and let on again at pleasure, at the same time the cylinder can be more uniformly heated in this way than when it is exposed to the common furnace-fire. Motion and heat having been applied to the cylinder, the operation of the same is as follows: It was stated that the smooth-surface cylinder did not agitate or properly stir the berries, in consequence of a want of proper obstructions in the cylinder to cause the berries to partake somewhat of its motion, and also that obstructions should be made without increasing the thickness of the metal at any point. The corrugated-surface roasting-cylinder furnishes all the necessary obstructions or shelved surface without the increased thickness of metal at one point over another, so that when the cylinder (drum) containing berries is rotated the longitudinal depressions in its surface receive and elevate small quantities of the berries a short distance and then discharge them into the bottom of the cylinder again, thus keeping up a constant rotation and transition of the berries, as long as the cylinder is rotated. Another advantage which I obtain in my waved-surface roasting-drum is, that I bring into a very small compass a very large amount of roasting-surface, and am thus enabled to complete the work in a much shorter time than formerly, without burning the berries.

When other berries (or grain) than coffee is to be roasted in the cylinder A, I attach a pipe to one end of the shaft B, leading into a flue, which pipe will conduct off the vapors and gases expelled from the clyinder; but when I roast coffee in the cylinder the aromatizing-box G is attached to one end of the shaft B, as above described, the other end of this shaft being closed by the valve $n$, and all the gas, &c., which escapes from the cylinder A passes into the box G through the perforated shelves $h\ h$ and out through the openings in the top, as shown in Figs. 1 and 2, wherein one side of the box is removed to show the interior. In this box G, I introduce various kinds of berries or grain after they have been roasted, and spread them over the perforated shelves $h\ h$, and by conducting the gases, which escape from the cylinder A during the roasting of coffee, through this box the contents will be impregnated with the aroma of the coffee, and when thus charged they will serve as a very good substitute for coffee.

The damper which I have represented in

Fig. 2 in the end of pipe or hollow shaft B may be used to close this end of the shaft if it is desired to apply an exit-pipe to the opposite end of this shaft; but as the box G is not rigidly attached by its pipe E to the shaft B, it may be removed and the exit-pipe applied in its stead.

When the roasting operation is complete, the collar $g'$ is loosened, and the cylinder A is again moved up to the opposite end of the shaft B for the purpose of discharging its contents into the lower hopper, D'. By turning the cylinder half around on its shaft, so as to bring its opening under the upper hopper, D, it may be again supplied with coffee, &c., for repeating the operation above described.

Although I have described my improved roasting-drum as being heated by means of gas or burning-fluid conducted through pipes which constitute a part of the supporting-frame, I do not thereby mean to confine the use of this cylinder to such heating devices, as it may be applied to a common furnace and heated in the usual manner. I however regard the gas-burning arrangement far superior to any other mode of roasting coffee or other materials used as substitutes for coffee.

Having thus described my invention, what I claim as new, and desire to secure by Letters Patent, is—

1. The hollow shaft B, in combination with a roasting-drum, the shaft serving to bear and to drive the roasting-drum A, and being provided with apertures $k\ k$ in its circumference, and outlets at one or both ends to conduct off the gases from the interior of the drum either into an aromatizing-chamber, G, or off into the chimney, substantially as described.

2. Making a part of the frame within which a coffee-roaster is arranged of tubes $d\ d$, which are slotted or punctured in such manner that they constitute fluid or gas burners, substantially as and for the purposes described.

3. The combination, with an aromatizing-chamber, G, of a roasting-drum, A, the same communicating with each other by means of a hollow shaft or equivalent device, substantially as and for the purposes described.

4. The combination of a corrugated cylindrical drum and a series of gas or fluid burners, which constitute the ties or longitudinal parts of the frame in which the drum is arranged, substantially as and for the purposes described.

5. A cylindrical corrugated tight roasting-drum, composed of one continuous piece of corrugated metal and two plates or heads, which are scalloped around their edges or circumferences, as and for the purpose described, in combination with an axial shaft, as set forth.

Witness my hand in the matter of my application for a patent on improved coffee-roasters this 7th day of August, 1863.

SAMUEL HOYT.

Witnesses:
R. W. FENWICK,
E. EVANS, Jr.